United States Patent [19]

Alm

[11] Patent Number: 4,821,337

[45] Date of Patent: Apr. 11, 1989

[54] RADIATION SCANNER UNIFORMITY SYSTEM

[76] Inventor: Ake W. Alm, 2145 Toscanini Dr., Rancho Palos Verdes, Calif. 90732

[21] Appl. No.: 792,715

[22] Filed: Oct. 30, 1985

[51] Int. Cl.$^4$ .............................................. G06K 7/00
[52] U.S. Cl. ....................................... 382/58; 358/113
[58] Field of Search .......................... 382/58; 358/113; 250/330, 332, 334

[56] References Cited

U.S. PATENT DOCUMENTS

| | | | |
|---|---|---|---|
| 3,996,421 | 12/1976 | Pruznick et al. ..................... | 358/166 |
| 4,217,608 | 8/1980 | MacGregor et al. ................ | 358/113 |
| 4,225,883 | 9/1980 | Van Atta et al. .................... | 358/113 |
| 4,400,729 | 8/1983 | Jones .................................... | 358/113 |
| 4,403,148 | 9/1983 | Coon et al. .......................... | 358/113 |
| 4,423,437 | 12/1983 | Beck et al. .......................... | 358/113 |

*Primary Examiner*—David K. Moore

[57] ABSTRACT

An imaging system incorporating a scanned array of infrared detectors for a presentation of scene data on a display includes gain normalization and averaging circuitry coupled to individual ones of the detectors of the detector array. The gain normalization is accomplished with gain control circuitry structured as a feedback loop introducing equality between the magnitude of an average value of a detector signal and a reference signal. The imaging system comprises a set of channels connecting with respective ones of the detectors, each channel having a gain control circuitry. A common value of the reference signal is applied to each channel. The averaging time is several times greater than the duration of a single scan in the scanning of the detector array so as to introduce gain normalization to subject matter which is substantially uniform throughout a swath of the scene swept by a detector while leaving image points of relatively small objects unaffected by the gain normalization. The display is relatively free of nonuniformities associated with differing responsivities of the detectors to infrared radiation.

10 Claims, 3 Drawing Sheets

RADIATION SCANNER UNIFORMITY SYSTEM

BACKGROUND OF THE INVENTION

1. Field of the Invention

This invention relates to radiation scanners and, more particularly, to a scanner employing an array of infrared detectors in combination with signal compression and averaging circuitry for improved uniformity in reproduction of scenes having substantial uniformity of temperature in each of a plurality of bar-shaped regions parallel to a line of scan.

2. Description of Related Art

One well-known form of infrared imaging system employs an array of infrared detectors and a lens for directing rays of radiation from a portion of a scene being viewed upon the array of detectors. Typically, the detectors are arranged along a line and are scanned in a direction perpendicular to the line, the line of detectors providing the width of a swath being swept during a single line of scan.

In one application of considerable interest, the scene being imaged is viewed on a display wherein the scan lines are parallel to a horizontal axis of the display while the line of detectors is parallel to a vertical axis of the display. Typical subject matter of the foregoing scene would include both sky and land. As viewed by infrared detectors, the sky presents subject matter which is of a lower temperature than the subject matter presented by land. Also included within the typical scene would be objects of higher temperature, such as aircraft, within the sky, and cooler subject matter such as a lake or river on the land. Buildings, roadways, trees, and other foliage may also be present as further subject matter within the scene.

The foregoing portions of the subject matter are characterized by infrared radiation at differing temperatures characteristic of the subject matter in response to illumination by the sun or in response to some other source of heat. The detectors produce electric signals of varying amplitudes dependent upon the temperature of the subject matter of the portion of the scene being viewed by respective ones of the detectors. Thereby, a display responsive to the magnitudes of the detector signals can present the forms of the various objects in the scene being viewed.

In viewing the foregoing scene, the scanner would be oriented relative to the scene such that the line of scan would be parallel to the horizon. As a result, individual swaths of the scene swept by corresponding ones of the detectors would be predominantly cool or predominantly warm depending on whether a detector was scanning a portion of the sky or a portion of the land. A path scan which traversed both a building and foliage, or a building and the lake, would view subject matter which, on the average, has a temperature between that of the sky and that of the land.

A problem arises in the operation of such a scanner due to a variation among the detectors in their responsivity to incident infrared radiation. Thus, two detectors receiving the same radiation may produce output signals of differing amplitudes. This further compounds the foregoing problem of the dynamic range in that portions of the image scanned by certain ones of the detectors may be overly intense in their presentation on the display. This intensifies the problem of streaking.

One solution to the problem of differing detector responsivity has been the use of individual alignment circuits incorporating manually adjustable potentiometers for each of the detectors. The solution is disadvantageous because of a requirement for excessive operator time in the manual adjustment of the potentiometers in a scanner of many, possibly in excess of one hundred, detectors in the detector array.

In the construction of the typical scanner, all of the detectors are placed within a single chamber which is maintained by cooling equipment at a low temperature. When replacement of a number of the detectors is required, the entire array is replaced in which case all of the potentiometers must be reset manually for alignment of the scanner.

A further solution to the dynamic range problem has been the scaling of all signals presented to the display as by use of automatic gain control employing the injection of a pilot signal into the field of view of each of the detectors. Such operation involves unwanted complexity such as additional optics for injection of an infrared pilot signal.

SUMMARY OF THE INVENTION

The foregoing problems are overcome and other advantages are provided by a radiation scanner incorporating a uniformity correction system of the invention. The correction system accomplishes a major object of the invention, namely, the attainment of uniformity in the display of a scene having both a large cool area and a large warm area, such as the foregoing scene of sky and land, and objects which are relatively large in the scanned field of view.

The scanner is constructed of an array of detectors of which the radiation receiving pattern is scanned across a scene containing an object to be viewed by the scanner. In accordance with the operation of the invention, the uniformity correction system includes electric circuitry for averaging detector signals from individual ones of the detectors over the duration of several or more sweeps of a scan. The detector signals are amplified by gain control amplifiers employing AC coupling which excludes signals resulting from a DC background radiation from the scene being scanned. Both long duration and short duration signals are amplified, the long duration signals being produced by radiation from subjects having an extent which is less than that of a scan line, but may occupy a portion of the scan extending from approximately five percent to approximately ninety-five percent of a scan line. Such subjects include buildings, roads, plant life, and other large subjects. The short duration signals result from relatively small targets occupying less than approximately five percent of a scan line, such small objects including aircraft, surface vehicles, and other relatively small subjects. The average value of the AC signal provided by the amplifiers of respective detector channels depends on the signal contributions of both the large and the small targets. The gain control is dependent on the average value of the amplifier signal in each of the respective detector channels. Since the small targets contribute relatively little energy to the total average of a scan line, the small targets do not significantly affect the gain control, the gain being dependent primarily on the contributions of the larger targets.

The theory of operation of the invention applies equally well to scanners of acoustic radiation, as well as to scanners of other regions of the electromagnetic spectrum.

BRIEF DESCRIPTION OF THE DRAWINGS

The foregoing aspects and other features of the invention are explained in the following description taken in connection with the accompanying drawings wherein.

DETAILED DESCRIPTION

Figure 1:
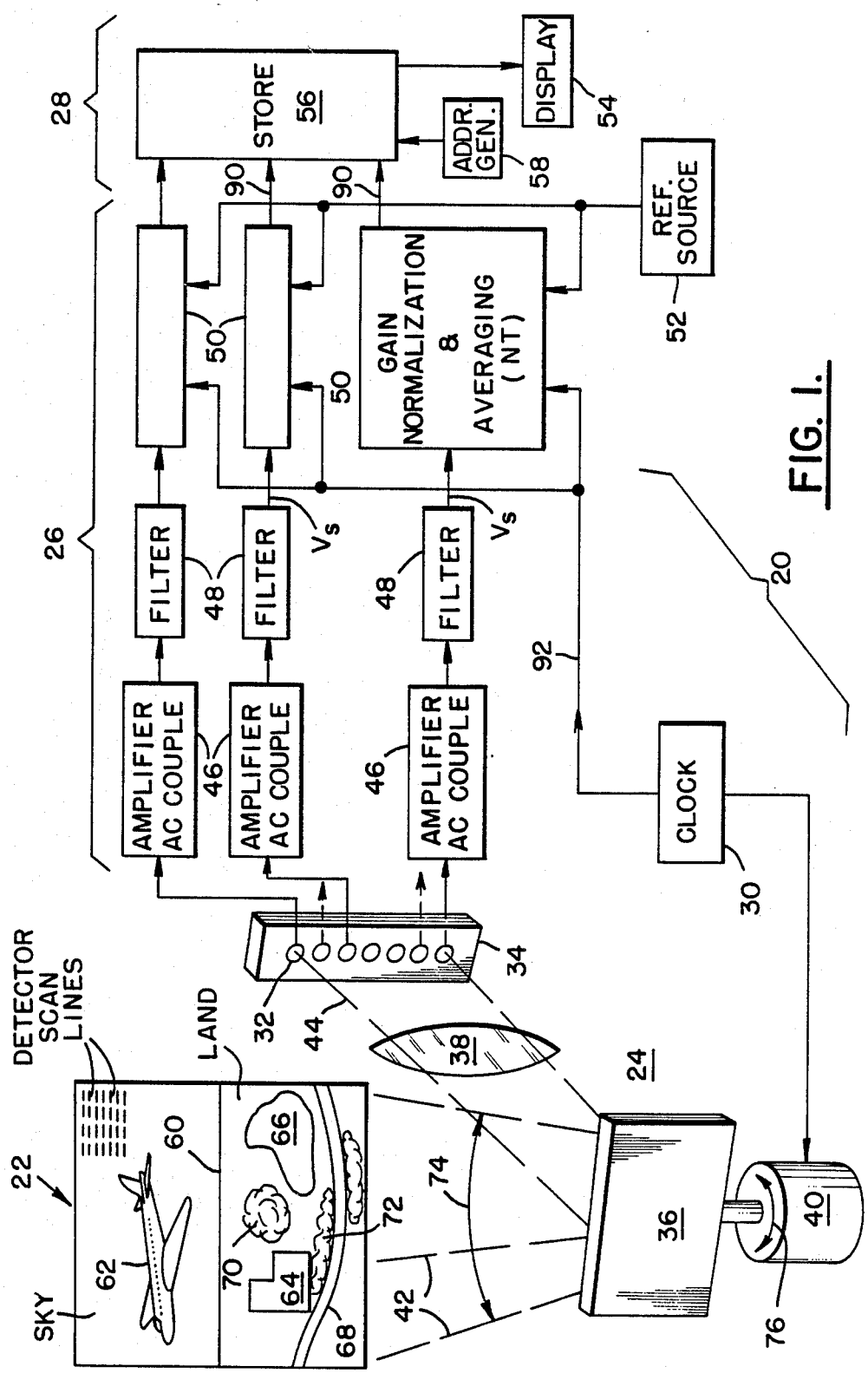
FIG. 1 is a block diagram of an imaging system incorporating a radiation scanner coupled to gain compression and averaging circuitry of the invention.

FIG. 1 shows a system 20 for forming an image of a scene 22. The system 20 comprises a scanner 24, a signal processor 26 coupled to the scanner 24, a data processor 28 coupled to the signal processor 26, and a clock 30 for synchronizing the operation of the scanner 24 and the signal processor 26. The scanner comprises an array of detectors 32 mounted within a support 34, a mirror 36 and a lens 38 for guiding radiation from the scene 22 to the detectors 32, and a drive unit 40 which pivots the mirror 36 cyclically. Rays 42 of radiation emanating from the scene 22 are reflected by the mirror 36 as rays 44 which propagate through the lens 38 to impinge upon the array of the detectors 32. The lens 38 focuses a region of the scene 22 upon the array of detectors 32. The pivoting of the mirror 36 by the drive unit 40 imparts a scanning motion to the rays 42 which sweep out a set of paths or swaths through the scene 22, with each path being associated with one of the detectors 32. The speed of the drive unit 40 is controlled by pulses from the clock 30 to provide a predetermined period to a scan of the rays 42 across the scene 22. For example, the mirror 36 may pivot at a rate of 60 Hz (hertz). The detectors 32 are responsive to the scene radiation incident thereupon for producing a set of output signals which are applied to the signal processor 26.

The signal processor 26 comprises a set of channels corresponding to respective ones of the detectors 32, with each channel including an amplifier 46, a filter 48, and a gain normalizing unit 50. Each of the amplifiers 46 receives the output signal of its corresponding detector 32 and amplifies the signal to a suitable level for further signal processing. Each amplifier 46 provides AC (alternating current) coupling of a detector signal to the corresponding filter 48. Signal components having a duration longer than approximately one-third second, this being the duration of approximately twenty line scans, are filtered out by the AC coupling so as to remove a DC (direct current) component from the background radiation of the scene. The filters 48 are low-pass filters having passbands equal to the useful frequency bandwidth of the detector signals and are used advantageously in accordance with common practice to maximize the ratio of signal-to-noise.

Figure 2:
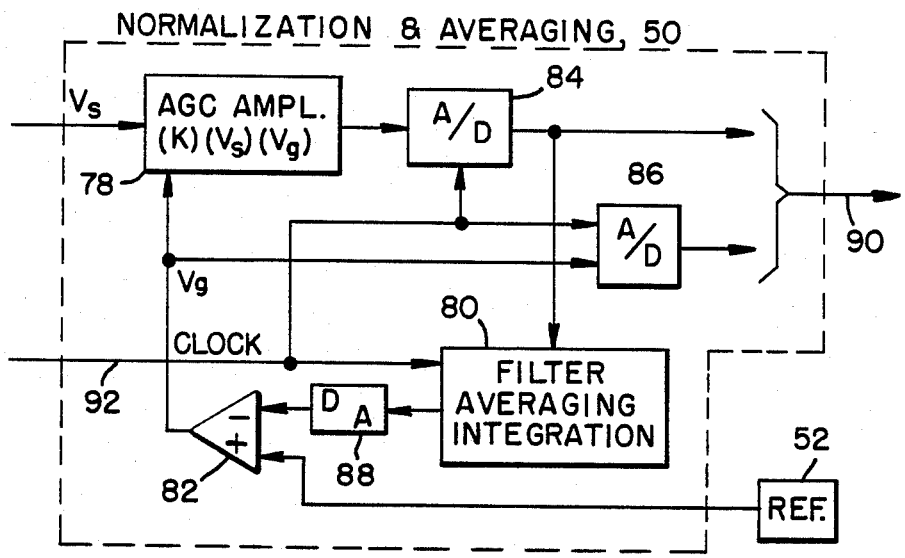
FIG. 2 is a detailed block diagram of the gain compression and averaging circuitry in one channel of the system of FIG. 1.

The normalizing units 50 in respective ones of the channels receive the signals outputted by corresponding ones of filters 48 and, as will be described in further detail hereinafter with reference to FIG. 2, provide for further amplification of the respective signals with gain normalization based on average values of the respective detector signals. With the use of digital averaging circuitry within the normalizing unit 50, the averaging circuitry is driven by clock pulses of the clock 30 to provide an averaging time equal to NT, wherein N represents several or more periods of the scanning and T is the duration of a single period. N may have an integral or nonintegral value. The signal processor 26 also includes a source 52 of a reference signal which is applied to each of the normalizing units 50 as will be explained hereinafter with reference to FIG. 2.

The data processor 28 comprises a display 54, a storage unit 56 which stores data to be presented on the display 54, and an address generator 58 which addresses the storage unit 56 to receive signals from respective ones of the normalizing units 50 and to output signals from the storage unit 56 to the display 54. The storage unit 56, the address generator 58 and the display 54 are operated in response to timing signals, not shown in the drawing, which are provided by the clock 30 or other suitable source of timing signals. The signals outputted from the normalizing units 50 in the respective channels of the signal processor 26 correspond to data points of the scene 22, these points being presented as pixels on the display 54. Thereby, the imaging system 20 presents an image of the scene 22 upon the face of the display 54.

In operation, the system 20 is adapted for the scanning of radiation emitted by subject matter of the scene 22 in the infrared portion of the electromagnetic spectrum. The principles of the invention also apply to other portions of the electromagnetic spectrum, as well as to scanning of fields of sound with acoustic detectors. However, the invention is most readily explained in terms of infrared imaging and, accordingly, the ensuing description will be directed to infrared imaging.

The scene 22 is provided by way of example to show typical subject matter which may be the subject of infrared imaging. The scanner 24 is directed towards the horizon 60 so as to include both sky and land within the scene 22. An aircraft 62 is shown above the horizon 60. A building 64, a lake 66, a road 68, a tree 70, and other foliage 72 are shown on the land. The intensity of infrared radiation emitted by the foregoing components of the scene 22 varies in accordance with the temperatures of the various components of the scene 22. Thus, the sky is relatively cool while the aircraft 62 is relatively warm. Similarly, the lake 66, the tree 70, and the foliage are relatively cool while the building 64 and the road 68 are relatively warm. As a result in the differences of temperatures of the foregoing objects in the scene 22, the intensity of radiation received by any one of the detectors 32 changes as the scanning path associated with an individual detector 32 passes over subject matter of differing temperatures.

The direction of scanning of the scanner 24 is the horizontal direction so as to provide scan lines for each of the detectors 32 which are parallel to the horizon 60. A set of exemplary scan lines for a few of the detectors 32 are shown as dashed lines in a portion of the sky. These scan lines define the paths of subject matter swept out by respective ones of the detectors 32 during a single pass across the scene 22. While only a relatively few detectors 32 are depicted in the drawing, it is to be understood that the line array of the detectors 32 includes a sufficient number of detectors 32 to cover the vertical dimension of the scene 22. Some of these detectors scan the sky while the balance of these detectors scan the land.

The direction of pivoting of the mirror 36 to provide the horizontal scanning is indicated by arcuate arrows 74 and 76. If desired, the drive unit 40 may be provided with a well-known tilt mechanism (not shown) for tilting the mirror 36 during alternate sweeping of the scan paths so as to provide an interlaced scan. During each cycle of the scanning, a detector 32 sweeps out the same path of the scene 22. Thus, each detector 32 is associated with the same strip-shaped portion of the scene 22 during a succession of scans.

In accordance with the invention, advantage is taken of the scan pattern wherein each of the detectors 32 repetitively scans the same portion of the scene 22. In addition, the invention takes advantage of the fact that the direction of each of the scan lines is parallel to the horizon 60. The invention provides for averaging signals outputted by a detector 32 over a duration of time equal to several or more cycles of the scanning, for example, 20 cycles of the scanning. The relatively cool background radiation of line scans of the sky and the relatively warm background radiation of line scans of the land are filtered out by the AC coupling. The average signal strength appearing in scan lines of the sky is based on the appearance of relatively small subjects such as aircraft. The average signal strength of line scans of the land is based on the contributions of relatively large subjects such as buildings. Thus, by use of the horizontal orientation of the line scans, the average values of subjects scanned in the sky is obtained independently of the average values of subjects scanned on the land.

Since the average value of the relatively large warm objects and the average value of the relatively cool objects have been forced by the normalizing units 50 to approximately equal the common reference signal, the signals representing the outline of the aircraft 62 are readily detected against both the sky and the land. Accordingly, the aircraft 62 can be presented on the display 54 without the effects of saturation and streaking associated with excessive dynamic range of detector signals resulting from wide variations in subject temperature. The foregoing operation of the gain compression circuitry normalizes each detector channel so that individual variations in detector responsivity to incident radiation have essentially no effect on a displayed image.

It is noted that the orientation of a plane of the scan relative to the horizon is significant with respect to the operation of the system 20. This may be appreciated by considering some other direction of scan, such as direction perpendicular to the horizon 60. In such a case, the detector scan lines would pass through both the cool area of the sky and the warm area of the land. In this case, the average value of a detector signal would be larger than that associated with the sky, but less than that associated with the land. The aircraft 62 would still be visible against the average value, but the difference between the signal strength associated with the aircraft 62 and that of the average value would be less than that of the previous case wherein the plane of scan is parallel to the horizon 60. However, other areas of the scene 22 might be characterized by weaker or stronger signals presented to the display 54. For example, the temperature of the sky may be so much less than that of the average value, that signals representing the sky would be weak in appearance upon the display 54. Also, with respect to the signals associated with the land areas, the signals may be strong in appearance on the display 54. Consequently, it is appreciated that the orientation of a scan plane parallel to the major boundaries of the cool and warm areas of the scene is advantageous for enhancement of the image of objects in a scene presented on the display 54. However, the horizon in the scene appears with greater clarity with the perpendicular scan.

With respect to scan lines passing through both the lake 66 and the building 64, it is observed that the average value of the detector signal would be between the low value associated with a cool area and the high value associated with a warm area. The outline of the lake 66 would then be visible on the display 54 even though detail of the water surface of the lake 66 may be absent because the signals associated with the lake 66 might be too small to appear on the display 54. Similarly, the outline of the building 64 would be visible on the display 54, but details on the surface of the building 64 may not be visible due to the excessive intensity of the signals which are to be presented on the display 54.

The foregoing operation of the invention may be regarded as the displaying of differential subject intensity, based on difference in temperature rather than the true intensity of signals emanating from various subject matter in the scene 22. The average value of a detector signal, which value serves as a background on the display 54 and as a reference for detecting the presence of an object in the scene 22, is established individually for each detector scan line. This provides for a greatly enhanced image on the display 54 as compared to some other form of signal compensation based on the average intensity of the complete scene which is to be imaged.

With reference also to FIG. 2, the normalizing unit 50 comprises an amplifier 78 having automatic gain control in response to a control signal Vg, a digital filter 80 providing the functions of averaging and integration, a differential amplifier 82, and two analog-to-digital converters 84 and 86. In operation, the construction of each of the compression units 50 is the same, this being the construction shown in FIG. 2. The amplifier 78 receives an input signal voltage Vs from a filter 48 (FIG. 1) and provides an output voltage proportional (by a constant K) to the product Vs and Vg. The output signal of the amplifier 78 is converted to digital format by the converter 84.

The output digitally formatted signal of the converter 84 is applied to the filter 80, the output thereof being coupled via a digital-to-analog converter 88 to a negative input terminal of the amplifier 82. The amplifier 82 has a differential input and subtracts the output signal of the converter 88 from the reference voltage applied by the source 52 to the positive input terminal of the amplifier 82. The amplifier 82 provides, at its output terminal, the signal Vg which is applied to the amplifier 78 and is also applied to the converter 86. The signal Vg is in analog form and is converted to digital format by the converter 86. The output digitally formatted signals of the converters 84 and 86 are coupled via line 90 to the storage unit 56 (FIG. 1).

The filter 80 is constructed in the form of a low-pass filter to provide for the functions of averaging and integration of a succession of digital samples of the detector signal Vs provided by the converter 84. The converters 84 and 86, as is well known, sample their respective input signals in response to clock pulse signals provided by the clock 30 on line 92. Operation of the filter 80 in response to the clock signals on line 92 synchronizes the operation of the filter 80 and converters 84 and 86. In view of the above-noted connection of the clock 30 to the scan drive unit 40, the period of time elapsed during the averaging or integration time of the filter 80 is in a fixed ratio to the scan period provided by the scanner 24.

The construction of the normalizing unit 50 is in the form of a feedback loop wherein the loop error signal is formed at the differential amplifier 82, and wherein the output signal Vg is proportional to the difference between an average detector signal and the reference signal.

A relatively large average value of detector signal, provided by the filter 80, results in a relatively small differential signal at the amplifier 82, with the result that the gain control signal Vg is small. Accordingly, detector signals of relatively large average value are multiplied by a relatively small gain control signal so as to provide an output signal on line 90 which approximates the value of the reference signal from the source 52. Correspondingly, detector signals of relatively small average value are multiplied by relatively large gain signals so as to provide an output signal on line 90 which approximates the reference signal from the source 52. In this way, the normalizing unit 50 provides a gain control signal which is inversely proportional to the average value of the detector signal.

With respect to the operation of the data processor 28, it is noted that complete data as to the magnitude of the detector signal is provided to the storage unit 56. This is accomplished by use of the two converters 84 and 86 wherein the scaled signal of the converter 84 and the scale factor, represented by the magnitude of the signal Vg, is provided by the converter 86. The digital signals of the converters 84 and 86 provide two digital words which are readily stored to provide data as to the magnitude of the detector signal.

In operation, the scanner 24 of FIG. 1 repetitively scans linear portions of the scene 22 to direct to the array of detectors 32, with each detector 32 detecting the radiation of a specific one of the linear portions of the scene 22. In response to the incident radiation, each detector 32 produces an output signal which is amplified by an amplifier 46. The amplifier 46, being AC coupled, responds only to changes in radiation resulting from the scanning, thereby to delete any residual output signal of a detector 32. After filtering by the corresponding low-pass filter 48, of the detector channel, the signal at the amplifier 46 enters the corresponding normalizing unit 50 to be multiplied by a gain control signal inversely proportional to the average value of the detector signal.

Changes in signal strength propagate through the normalizing units 50 to be stored in the storage unit 56. Signals which change slowly, as compared to the scanning period, pass through the filter 80 to alter the gain of the amplifier 78 to a value which compensates for the presence of the slowly varying signal. Thereby, only relatively fast signals obtained from subject matter occupying no more than a fraction of a scan line pass through the compression unit 50 to be stored in the storage unit 56. In addition, the plane of scanning is parallel to the long dimension of a region of substantially constant temperature in the scene 22, such as the sky or the land, so as to obtain more fully the benefits of the averaging function of the filter 80. This permits the display 54 to present data from a scene having high dynamic range with respect to subject temperature.

In view of the foregoing operation, the imaging system 20 is able to operate without manual calibration of the individual detector channels. The foregoing averaging function of the filter 80 in the feedback loop of the compression 50 automatically compensates for any increased or decreased gain associated with individual responsivities of detectors 32 to the incident radiation. Thereby, the circuitry in each of the channels of the signal processor 26 serves to normalize each of the respective detector signals to provide uniformity of a displayed image. Since a common reference signal, from the source 52, is used in all of the channels, the gains of the respective channels are equalized independently of variations in detector sensitivity. This provides uniform development of the scene image between adjacent scanned regions of the scene. The uniformity is obtained even in the presence of a lack of uniformity among the various detectors in the array of the detectors 32.

Figure 3:
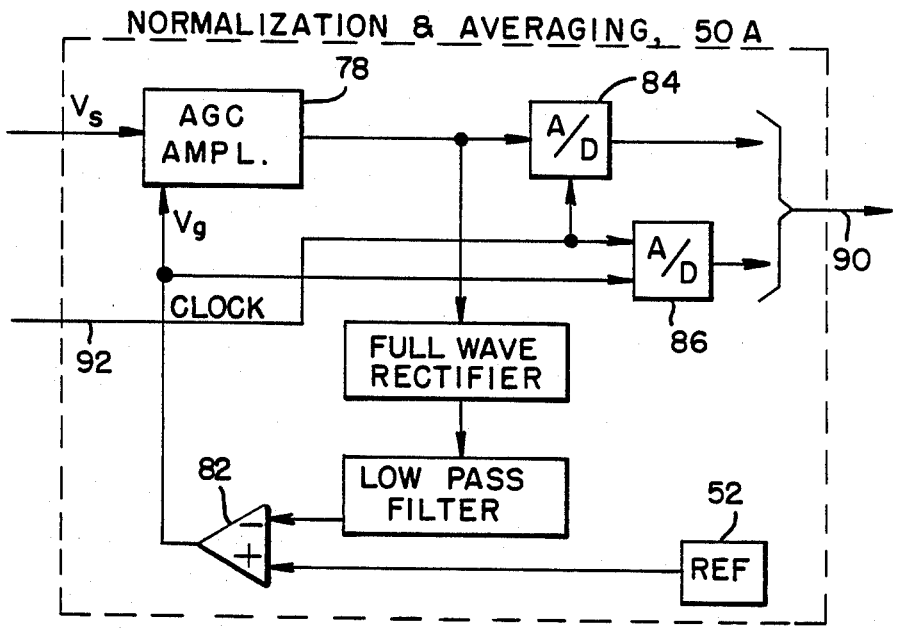
FIGS. 3 and 4 show alternative embodiments of a compression unit of FIG. 2.

By way of alternative embodiments, it is noted that the digital filter 80 may be replaced with an analog low-pass filter such as an RC (resistor-capacitor) filter, as is shown in the normalization unit 50A of FIG. 3. With the analog RC filter, the clock signal on line 92 would no longer be utilized by the filter. In addition, the converter 88 would no longer be employed at the output of the filter since the output signal is already in analog format. In addition, the input terminal of the low-pass filter would no longer be connected to the output terminal of the converter 84, but, rather, would be coupled via a full wave rectifier to the output terminal of the amplifier 78.

The full wave rectifier is employed in view of the AC coupling of the amplifier 46. The rectifier converts the AC signal format of positive and negative excursions of the signal waveform to a unipolar waveform which is to be filtered by the analog low-pass filter. A fully analog system may be constructed, if desired, by applying the output signals of the amplifier 78 and 82 directly to a television-type display (not shown) without use of the converters 84 and 86. In this case the drive unit 40 can be driven by 60Hz power line current without use of the clock 30.

In the case where the detector voltage is in the form of a square or rectangular wave, which waveform is then applied to the full wave rectifier, it has been found that the ratio of temperature increment of an object in the scene 22 to the average temperature of the region being scanned by the detector is essentially equal to the duty cycle in the rectangular waveform, particularly for large objects in the scene, for example, an object that extends possibly half-way along a scan line within the scene 22. This result is fortunate in that it introduces uniformity to a displayed image in addition to such uniformity as is introduced by the action of the normalizing unit 50. This benefit is present with either the analog or digital embodiments of the filter 80, it being understood that the averaging or integration time of both embodiments of the filter is the same.

Figure 4:
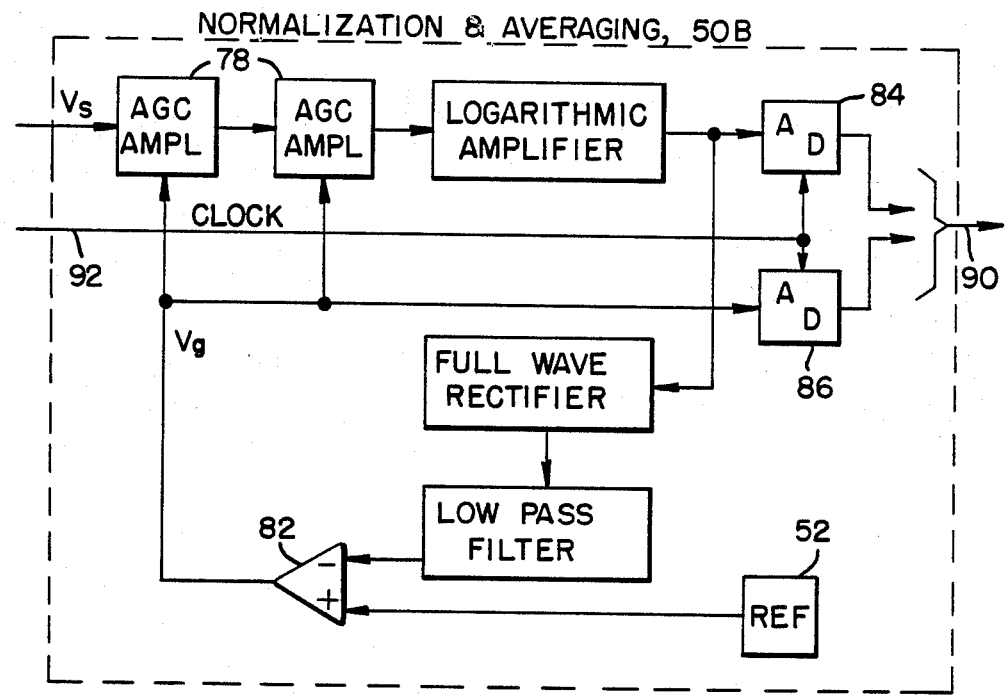

The foregoing benefits are obtained also with a further embodiment of the normalizing unit 50 which introduces a nonlinear gain compression. By way of example, as shown in the normalizing unit 50B of FIG. 4, the gain control amplifier 78 may be followed by a second such amplifier, the latter also being controlled by the gain signal Vg, the latter amplifier then being followed by a logarithmic amplifier to introduce a square root to the product of the gains of the three serially connected amplifiers. Again, the feedback loop construction tends to zero the loop error signal at the differential amplifier 82 so that average values of the radiation detector signal are brought into substantial equality with the value of the reference signal of the reference source 52.

The gain control to be employed within the compression unit 50, or alternative embodiments thereof, may be selected to maximize the benefits of the invention for particular formats of scene image. While such more complex amplification factors may be used in the forward branch of the normalizing unit 50B, it is to be understood that good results are obtained with the digital embodiment of the normalizing unit 50 disclosed in FIG. 2 or with the alternative analog embodiment of the filter 80 (FIG. 3) in conjunction with the full-wave rectifier.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An imaging system comprising:
   an array of radiation detectors arranged along the vertical dimension of a scanning pattern;
   means for directing radiation from an object, distant from said system, toward said array of detectors to permit a viewing of said object by said system, said directing means including means for scanning said radiation along a horizontal dimension of said scanning pattern with a scan interval of predetermined duration to provide a two-dimensional raster scan of a scene including said object, each of said detectors providing a signal in response to radiation incident upon the detector;
   means for processing data carried by signals of respective ones of said detectors, said data processing means including means for displaying the data to present a scene containing said object;
   signal processing means interconnecting said data processing means with said array of detectors, said signal processing means including gain normalizing means for amplifying individual ones of said detector signals with a gain varying inversely to average signal strength; and wherein
   said normalizing means comprises means for averaging the signals of individual ones of said detectors over an averaging interval of time several times larger than the duration of said scan interval to enhance the uniformity of a data display by said processing means with respect to regions of said scene extending horizontally along the raster and having substantially uniform temperature;
   said normalizing means includes a gain control circuit having a feedback loop with a forward branch and a feedback branch for processing the signals of each of said detectors independently of the signals of the other ones of said detectors, there being multiplying means in said forward branch for applying said gain to individual ones of said detector signals, said averaging means being located in said feedback branch; and
   said normalizing means further comprises a source of reference signal and differential means for comparing an output signal of said averaging means with said reference signal to output a loop error signal to a terminal of said multiplier means to establish a value of said gain.

2. A system according to claim 1 wherein said signal processing means comprises a set of channels with individual ones of said channels connecting with respective ones of the detectors in said array of detectors, and wherein said gain normalizing means is structured as a set of gain control circuits each of which is constructed as said first-mentioned gain control circuit, there being one of said gain control circuits in each of said channels.

3. A system according to claim 2 wherein said loop error signal serves as a gain factor for said multiplying means; and the gain control circuit in each of said channels comprises means for coupling a gain factor to said data processing means.

4. A system according to claim 3 wherein a common reference signal is employed in each of said gain control circuits.

5. A system according to claim 1 wherein said radiation is infrared radiation.

6. An imaging system comprising:
   an array of radiation detectors;
   means for directing radiation from a scene being imaged towards said detectors, said directing means including means for scanning said radiation along a line of scan and means for supporting said array of detectors, said array of detectors being arranged transversely to said scan line to permit each detector to sweep out separate scan paths across said scene for generating an image of said scene;
   said directing means being oriented relative to a scene such that said scan line is generally parallel to a boundary of a region of said scene having a uniform radiation characteristics;
   means for AC coupled to respective ones of said detectors for amplifying signals produced by respective ones of said detectors in response to radiation incident upon the detectors, said amplifying means including means for normalizing the gain of the amplifying to accentuate the presence of an object in an image of said scene, which object has a radiation characteristic different from radiation of background material in said scene; and
   wherein said normalizing means includes means for averaging separately the signals of respective ones of said detectors to establish a separate background level in each scanned path of an image of said scene for improved uniformity of said image.

7. A system according to claim 6 wherein said radiation is infrared radiation, and wherein said radiation characteristic is the temperature of a region of said scene from which radiation emanates.

8. In an imaging system for forming an image of a scene emitting radiation which scene comprises an array of radiation detectors and means for directing radiation from a scene being imaged toward said detectors, said directing means including means for scanning said radiation along a line of scan and means for supporting said array of detectors, said array of detectors being arranged transversely to said scan line to permit each detector to sweep out separate scan paths across said scene for generating an image of said scene; a method comprising the steps of:
   orienting said directing means relative to a scene such that said scan line is generally parallel to a boundary of a region of said scene having a uniform radiation characteristic;
   amplifying signals of respective ones of said detectors produced by the detectors in response to radiation incident upon the detectors, said amplifying producing a gain in the amplitude of respective ones of the detector signals;

averaging separately the detector signals subsequent of said step of amplifying to provide an average value of each detector signal representative of a background level of radiation in each scanned path of an image of said scene for improved uniformity of said image;

comparing said average value for each said detector signals with a common reference to produce differential signals representing a difference between each of said average values and said reference; and normalizing the gain of each of said detector signals by means of said differential signals for improved dynamic range of subject matter which can be imaged by said imaging system.

9. In an imaging system, a method according to claim 8 wherein said steps of averaging and normalizing compensate for variation in responsivity of said detectors to the radiation, and radiation being infrared radiation, said dynamic range being a range of temperature of subject matter being imaged, and said radiation characteristic being the temperature of the subject matter being imaged.

10. In a multiple channel infrared imaging system employing a scanning of object space, the improvement comprising:

means in each channel of said system for detecting infrared radiation of a scanned object, said detecting means including an AC coupled output stage providing output signals having a duty cycle dependent on said scanning and on the temperature of objects in said object space;

means for normalizing signals received in each of said channels independently of signals received in each of the other of said channels, said normalizing means comprising means for averaging the output signal of said detecting means in each of said channels to provide an average value in each of said channel, said normalizing means further comprising means for scaling an output signal of said detecting means in each of said channels by the corresponding average value, an output signal of the scaling means serving as an output signal of the normalizing means in each of said channels; and means coupled to said normalizing means and responsive to output signals of said normalizing means for displaying an image of said object in space.

* * * * *